(12) United States Patent
Louie et al.

(10) Patent No.: US 11,590,461 B2
(45) Date of Patent: Feb. 28, 2023

(54) APPARATUS AND METHOD FOR EXTRACTING COMPONENT IN SOLID BY USING NANOBUBBLES

(71) Applicant: Severin Asia Limited, Shenzhen (CN)

(72) Inventors: Wai Hang Louie, Hong Kong (CN); Marko Walter Unger, ShenZhen (CN); Kowk Wai Wong, Hong Kong (CN); Ka Yee Ho, Hong Kong (CN); Sum Hang Grace Poon, Hong Kong (CN)

(73) Assignee: SEVERIN ASIA LIMITED, Hong Kong (HK)

(*) Notice: Subject to any disclaimer, the term of this patent is extended or adjusted under 35 U.S.C. 154(b) by 240 days.

(21) Appl. No.: 16/874,195

(22) Filed: May 14, 2020

(65) Prior Publication Data
US 2020/0360872 A1    Nov. 19, 2020

(51) Int. Cl.
| | |
|---|---|
| *B01F 23/23* | (2022.01) |
| *A23L 2/54* | (2006.01) |
| *B01F 23/30* | (2022.01) |
| *B01F 23/213* | (2022.01) |
| *A47J 31/44* | (2006.01) |
| *B01F 23/2373* | (2022.01) |

(52) U.S. Cl.
CPC .............. *B01F 23/23* (2022.01); *A23L 2/54* (2013.01); *B01F 23/2133* (2022.01); *B01F 23/30* (2022.01); *A47J 31/4432* (2013.01); *B01F 23/2373* (2022.01)

(58) Field of Classification Search
CPC .......... B01F 23/23; B01F 23/2123; A23L 2/54
See application file for complete search history.

(56) References Cited

U.S. PATENT DOCUMENTS 9,452,036 B2 * 9/2016 Nakashima ............ A61C 17/20
2017/0015673 A1    1/2017 Wang et al.

FOREIGN PATENT DOCUMENTS

| CN | 202060612 U | 12/2011 |
|---|---|---|
| CN | 103720351 A | 4/2014 |
| CN | 107307743 A | 11/2017 |
| CN | 107413219 A | 12/2017 |
| KR | 20170069480 A | 6/2017 |

OTHER PUBLICATIONS

Search Report received in International Application No. PCT/CN2019/106114 dated Jan. 23, 2020, with translation, 4 pages.

* cited by examiner

*Primary Examiner* — Robert A Hopkins (57) ABSTRACT

The present invention discloses an apparatus and a method for extracting a component in a solid by using nano-bubbles, the apparatus including a reaction container configured to hold a solid to be extracted, a nano-bubble generating device configured to generate a liquid containing nano-bubbles, and an energy generator, wherein the liquid containing nano-bubbles is used to be mixed with the solid to be extracted, and the energy generator is used to emit energy to the reaction container to burst the nano-bubbles and enhance the extraction effect of the solid in the liquid.

16 Claims, 6 Drawing Sheets

| Nano-bubble generating device | Below environment temperature | | Room temperature | |
|---|---|---|---|---|
| Duration (min) | 0 | 5 | 0 | 5 |
| Air bubble size (nm) | - | 115.4 | - | 187.5 |
| Bubbles/number per ml (background correction) | - | $2.43 \times 10^7$ | - | $3.13 \times 10^7$ |
| Temperature °C | 6.45 | 6.85 | 22.08 | 22.19 |

APPARATUS AND METHOD FOR EXTRACTING COMPONENT IN SOLID BY USING NANOBUBBLES

CROSS-REFERENCE TO RELATED APPLICATION(S)

This application claims the benefit of and priority to 1) International application no. PCT/CN2019/106114, filed on Sep. 17, 2019, for "Apparatus and Method for Extracting International Ingredient by Using Nano Bubbles" and 2) Chinese Patent Application No. 2019104152112.9, filed on May 17, 2019, for "Apparatus and Method for Extracting International Ingredient by Using Nano Bubbles", the entire disclosures of which are incorporated herein by references.

TECHNICAL FIELD

The present invention relates to the field of extracting components in solids, and specifically relates to an apparatus and a method for extracting a component in a solid by using nano-bubbles.

BACKGROUND

A method of extracting a component in a solid includes extracting coffee powder, Chinese, Western and Japanese tea powders, herbal tea, etc., to make a beverage. A general method in the market is to put a solid powder into a container, pour an appropriate amount of water, stir manually or stir by mechanical devices, and then soak for a period of time (usually 12 to 24 hours) to bring components such as vitamin C, polyphenolic antioxidants, and caffeine in the solid into the water to complete the extraction process to prepare a beverage containing the aforementioned components. However, this method usually does not extract sufficient components, resulting in a poor taste of the beverage.

Therefore, the prior art needs further development and progress.

SUMMARY

In view of the above technical problem, an embodiment of the present invention provides an apparatus and a method for extracting a component in a solid by using nano-bubbles to solve the problem of insufficient extraction of components in solids in existing extraction methods.

Technical solutions of the present invention are as follows:

An apparatus for extracting a component in a solid by using nano-bubbles, wherein the apparatus includes a reaction container configured to hold a solid to be extracted, a nano-bubble generating device configured to generate a liquid containing nano-bubbles, and an energy generator, the liquid containing nano-bubbles is used to be mixed with the solid to be extracted, and the energy generator is used to emit energy to the reaction container to burst the nano-bubbles.

The aforementioned apparatus, wherein the apparatus further includes a conveying device configured to convey the liquid containing nano-bubbles to the reaction container to be mixed with the solid to be extracted, the nano-bubble generating device includes a fluid inlet tube and a fluid outlet tube, and the fluid outlet tube is connected with the conveying device.

The aforementioned apparatus, wherein the apparatus further includes a liquid storage container which is connected with the fluid inlet tube.

The aforementioned apparatus, wherein the conveying device includes a liquid pump and a conduit, and the liquid pump is connected with the reaction container through the conduit.

The aforementioned apparatus, wherein the apparatus further includes a heater which is arranged at any one position of a position above the liquid storage container, a position between the liquid pump and the reaction container, and a position below the reaction container.

The aforementioned apparatus, wherein the energy generator is a sonic generator or an ultrasonic generator.

The aforementioned apparatus, wherein the energy generator includes an emission head which is arranged above the reaction container, and a first switch valve configured to control a solution output state is arranged on the reaction container.

The aforementioned apparatus, wherein a first cutter head for piercing is further arranged at the bottom of the reaction container, and the first cutter head is interlocked with the first switch valve.

The aforementioned apparatus, wherein the solid is coffee powder or tea powder, and the liquid is water.

A method for extracting a component in a solid by using nano-bubbles, including the following steps:

generating a liquid containing nano-bubbles by a nano-bubble generating device;

conveying the liquid containing nano-bubbles to a reaction container to mix and react with a solid to be extracted in the reaction container;

during mixing and reaction, emitting energy to the reaction container by an energy generator to burst nano-bubbles.

The technical solutions provided by the present invention use a nano-bubble generating device to increase the content of nano-bubbles in a liquid, convey the liquid containing nano-bubbles to a reaction container to mix with a solid powder, and simultaneously start an energy generator to act on the mixed liquid to burst the nano-bubbles to enhance the extraction effect of the component in the solid in the liquid.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

In order to make the objects, technical solutions and advantages of the present invention clearer, the present invention will be further described in detail below with reference to the embodiments. However, the scope to be protected by the present invention is not limited to the specific embodiments described below.

Figure 1:
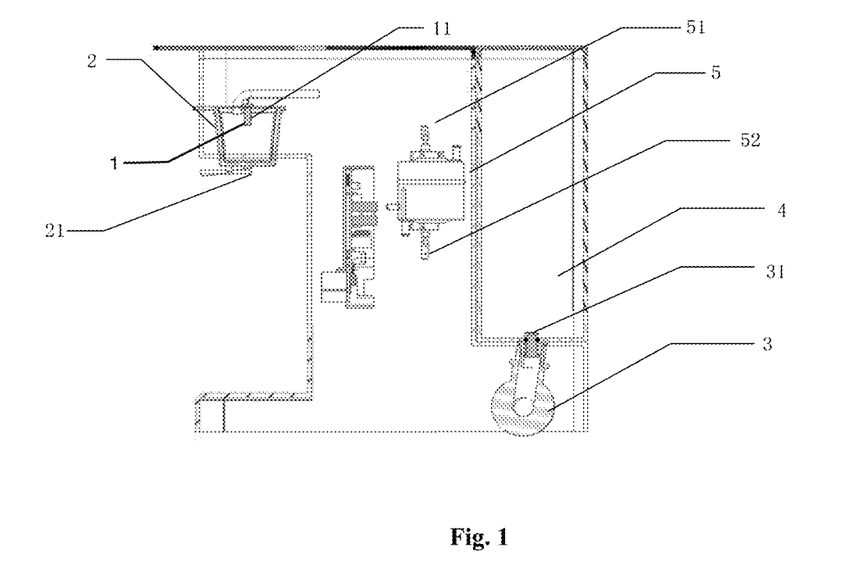
FIG. 1 is a sectional view of an apparatus for extracting a component in a solid by using nano-bubbles according to an embodiment of the present invention.
Figure 2:
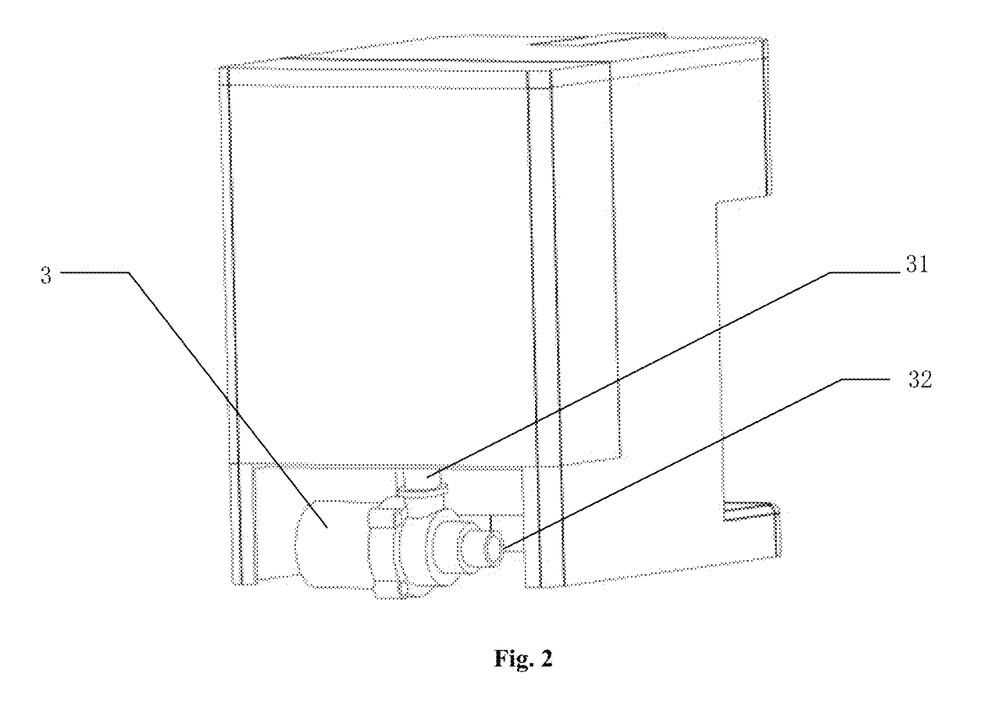
FIG. 2 is a perspective view of an apparatus for extracting a component in a solid by using nano-bubbles according to an embodiment of the present invention.

As shown in FIG. 1, an apparatus for extracting a component in a solid by using nano-bubbles includes a nano-bubble generating device 3, a reaction container 2, and an energy generator 1 (partially shown in the drawing), wherein the nano-bubble generating device 3 and the reaction container 2 are arranged on a rack, the energy generator 1 includes a detector 11, and the detector 11 is arranged above the reaction container 2 so as to emit energy to the reaction container 2 to burst nano-bubbles.

The solid is a solid powder, including coffee powder, Chinese, Western and Japanese tea powders, and herbal tea. The energy generator includes any one of a sonic generator, an ultrasonic generator, and a laser generator.

Figure 4:
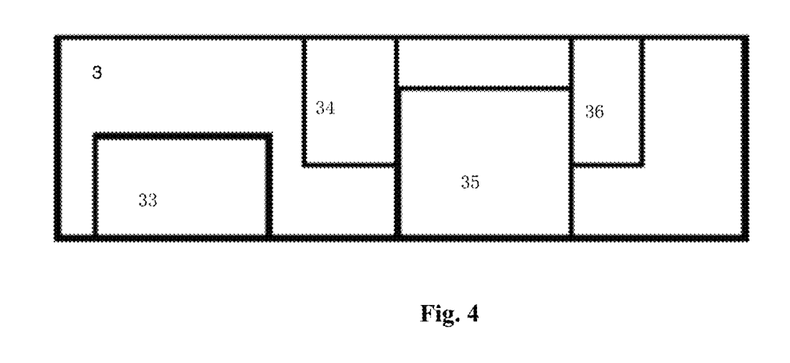
FIG. 4 is a schematic view of a nano-bubble generating device according to an embodiment of the present invention.

The following structure may be used in the nano-bubble generating device:

As shown in FIG. 1 and FIG. 4, the nano-bubble generating device includes an air pump 33, a fluid circulation pump 35, a gas conveying assembly 34, a coarse assembly 36, a fluid inlet tube 31, and a fluid outlet tube 32, wherein the gas conveying assembly 34 is configured to include a micropore or a micro slit, and the coarse assembly 36 includes a micropore or a micro slit used to disperse air bubbles in a fluid.

When a fluid passes through the gas conveying assembly 34, the fluid circulation pump 35 generates a high-speed fluid flow. The velocity of the fluid suddenly increases to reduce the pressure of the surface of the gas conveying assembly 34 near the micropore or the micro slit. Air bubbles on the surface of the micropore or the micro slit receive a strong separation force, and micro-bubbles and even nano-bubbles are generated. The generated micro-bubbles and nano-bubbles are sucked into the fluid circulation pump 35 and are forced to disperse on the coarse assembly 36 to generate more uniform and stable nano-bubbles. Nano-bubbles having different concentrations and diameters can be generated by controlling the gas flow rate, fluid flow rate, and roughness of the coarse assembly 36.

A pre-filter having a diameter of 0.4 μm is arranged on an air conveying conduit of the air pump 33, and the fluid flow rate of the fluid circulation pump 35 is at least 1800 L/H. The gas conveying assembly 34 includes at least one micropore having a diameter set to 30 μm to 40 μm. The coarse assembly 36 has an average roughness of 5 μm to 50 μm.

The diameter of nano-bubbles that may be generated by the nano-bubble generating device configured with this structure is at least smaller than 300 nm, and the concentration of the nano-bubbles in the liquid is at least $1\times10^7$ unit/L.

A system for generating oxidation bubbles in a fluid disclosed by a patent with the application number of 2017101567342 may also be used in the nano-bubble generating device 3. Of course, any other system capable of generating nano-bubbles in the market may also be used. It is not limited in the present invention, as long as it can generate nano-bubbles in a liquid (e.g., water) and can make the liquid flow out.

The apparatus further includes a liquid storage container 4 which is arranged above the nano-bubble generating device and is connected with the fluid inlet tube 31 to hold a liquid such as water.

The reaction container 2 may be arranged below the fluid outlet tube 32 to hold a liquid discharged from the outlet tube. Of course, the reaction container 2 may also be arranged above the nano-bubble generating device 3 and a liquid may be conveyed to the reaction container by a liquid pump. This is also convenient for a user to get a liquid using a container such as a cup after a solid is sufficiently extracted.

Preferably, a conveying device (not shown in the drawings) is provided in the apparatus for extracting a component in a solid by using nano-bubbles of the present invention. The fluid outlet tube is connected with the conveying device so that a liquid containing nano-bubbles discharged from the fluid outlet tube can be conveyed to the reaction container to mix with the solid to be extracted. The conveying device includes a liquid pump and a conduit. One end of the liquid pump is connected with the liquid outlet tube 32, and the other end is connected with the conduit to pump the liquid reacted through the nano-bubble generating device 3 to the reaction container 2.

A heater is further provided in the apparatus for extracting a component in a solid by using nano-bubbles of the present invention. The heater may be arranged at any one position where the fluid flows through the process, for example: the heater may be arranged on the liquid storage container to heat a liquid in the liquid storage container, or may be arranged below the reaction container at a lower end of an extracted liquid outlet to heat an extracted liquid, or may be arranged between the reaction container and the liquid pump to heat a liquid containing nano-bubbles. In the present embodiment, the conduit of the conveying device includes a first conduit and a second conduit. The liquid pump is connected with an input end 52 of the heater 5 through the first conduit, and an output end 51 of the heater is connected with the reaction container through the second conduit. When there is a need to heat a liquid, the heater 5 is turned on to heat a liquid flowing by, and when there is no need to heat a liquid, the heater 5 is turned off.

Figure 3:
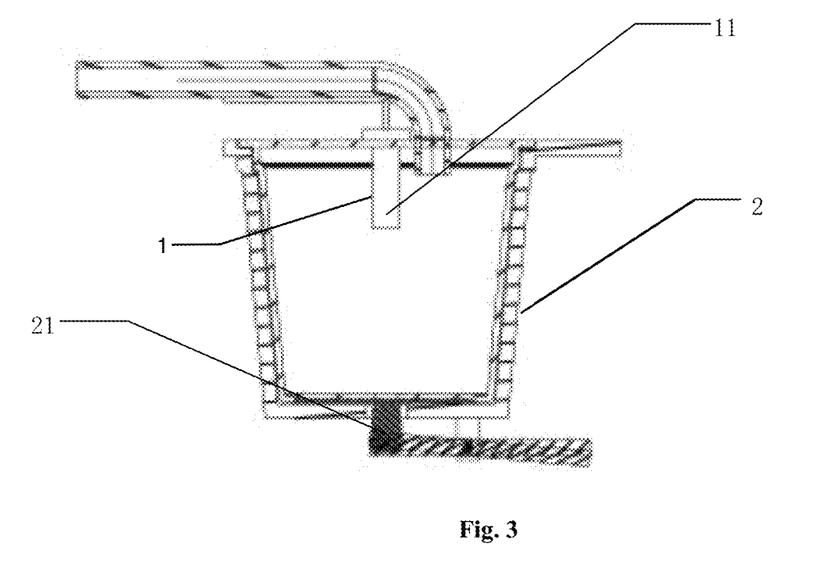
FIG. 3 is a front view of a reaction container according to an embodiment of the present invention.

The reaction container 2 has a plurality of configuration modes, for example: in a first mode, it is configured as a separate reaction container and a solid to be extracted and a liquid containing nano-bubbles directly react in the container, a switch valve 21 is arranged at the bottom of the reaction container to control the discharge of a solution in the container, a cover body is provided above the reaction container and two through holes, i.e., a first through hole and a second through hole, are provided on the cover body to allow the detector 11 and the second conduit to penetrate respectively.

However, the solid is directly extracted in the aforementioned first kind of reaction container and the solid waste residue needs to be cleaned after the completion of the extraction, which is inconvenient. Therefore, the present invention has been improved as follows:

A reaction container is provided. A first cutter head is provided at the bottom of the reaction container, and the first cutter head is interlocked with a first switch valve. When the first switch valve is closed, the first cutter head protrudes to pierce, and when the first switch valve is opened, the first cutter head retracts so that the liquid extracted in the reaction container can flow out.

A cover body is further provided above the reaction container, and a second cutter head and a second switch valve are provided on the cover body. The second switch valve is connected with the second conduit to control the flow rate of the liquid containing nano-bubbles, and the second cutter head is interlocked with the second switch valve. When the second switch valve is closed, the second cutter head protrudes to pierce, and when the second switch valve is opened, the second cutter head retracts to allow the liquid containing nano-bubbles to flow into the reaction container.

During extraction, a coffee capsule is put into the reaction container and is covered with the cover body, and the first and the second switch valves are closed. At this time, the second cutter head on the cover body pierces the seal of the coffee capsule and the first cutter head pierces the bottom of the coffee capsule. Then, the second switch valve can be controlled to open so that the liquid containing nano-bubbles can be conveyed to the coffee capsule to extract coffee powder in the capsule. After extraction, the first switch valve can be controlled to open to discharge the extracted coffee solution.

The working process of the apparatus for extracting a component in a solid of the present invention will be described as follows using an example where the solid to be extracted is coffee powder, the liquid used is water, and the energy generator used is an ultrasonic generator: A quantity of coffee powder is added to the reaction container in advance, and a predetermined amount of water is conveyed from the liquid storage container to the nano-bubble generating device to generate water containing nano-bubbles after being acted on by the nano-bubble generating device for a certain period of time. The liquid is discharged to first pass through the heater and then be sent to the reaction container by the liquid pump. The coffee powders are extracted in the liquid, and at the same time, the ultrasonic generator is started to emit energy to the coffee mixture through the detector. Under the action of ultrasonic waves, the nano-bubbles in the water will burst, thereby accelerating the extraction of the coffee powders in the liquid and enhancing the extraction effect.

A method for extracting a component in a solid by using the apparatus includes the following steps: generating a liquid containing nano-bubbles by the nano-bubble generating device; conveying the liquid containing nano-bubbles to the reaction container to mix and react with the solid to be extracted in the reaction container; during mixing and reaction, emitting energy to the reaction container by the energy generator to burst the nano-bubbles.

When the energy generating device is an ultrasonic generator, it provides a frequency of at least 20 KHZ and an intensity of at least 30 W/in$^2$. Water is used as the liquid, and tap water, mineral water or distilled water at room temperature may be used. Alternatively, tap water, mineral water or distilled water having a temperature lower than environment temperature may be used, and the aforementioned water having a temperature lower than environment temperature can be obtained by freezing in a refrigerator to 4° C. or lower.

The liquid storage container, the gas conveying assembly, the coarse assembly, and the reaction containers are made of stainless steel, ceramic or any material that can come into contact with food.

Figure 5:
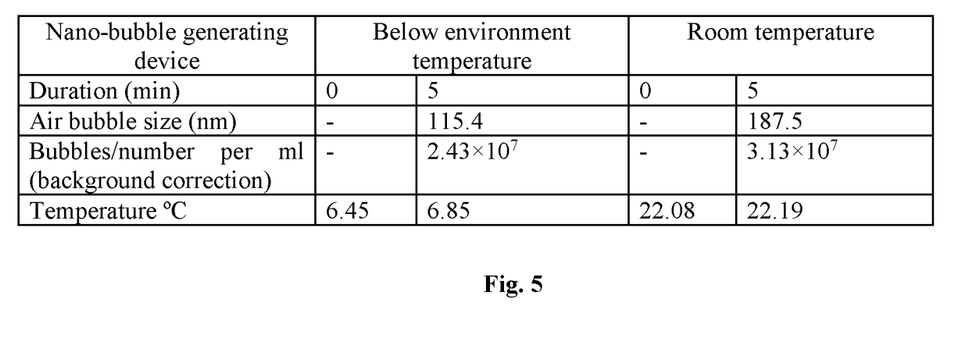
FIG. 5 is a diagram of effects of generating nano-bubbles at different temperatures by the nano-bubble generating device according to an embodiment of the present invention.

As shown in FIG. 5, when the nano-bubble generating device is used, the device works 5 minutes at room temperature of 22.1° C. to generate $3.13 \times 10^7$ units of air bubbles in each liter of water, and the size of the air bubbles is 187.5 nm. When the device works 5 minutes at a temperature lower than environment temperature, the device generates $2.43 \times 10^7$ units of air bubbles in each liter of water, and the size of the air bubbles is 115.4 nm.

Within the same time, coffee extracted by using the apparatus has a better effect than the conventional cold brewed coffee. For example, in the same 5 minutes, compared with the conventional cold brewed coffee, the Brix of the coffee extracted by using the apparatus is 30% higher, and the antioxidant activity is 30% higher.

The effect will be described through the following specific examples:

Example 1

Figure 6:
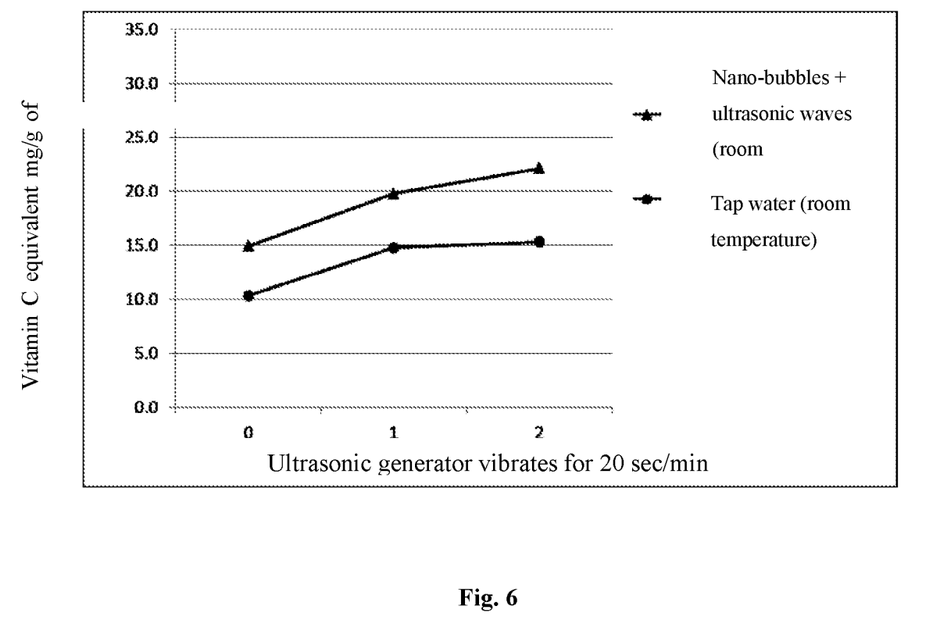
FIG. 6 is an effect comparison diagram of antioxidant levels of coffee made by cold brewing and coffee extracted using the apparatus of the present invention at room temperature.
Figure 7:
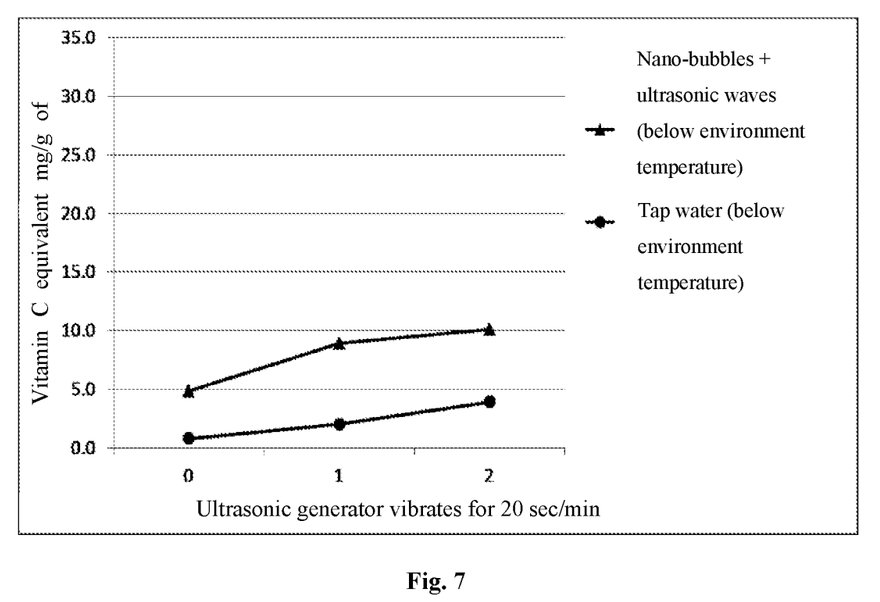
FIG. 7 is an effect comparison diagram of antioxidant levels of coffee made by cold brewing and coffee extracted using the apparatus of the present invention at a temperature lower than environment temperature.

As shown in FIGS. 6 to 7, the antioxidant level of coffee made by the conventional cold brewing method and the antioxidant level of coffee extracted using the apparatus at room temperature are compared. When the conventional cold brewing method was used, a certain amount of coffee powder was added to tap water to react for one minute, and the level of scavenging free radicals relative to vitamin C in the conventional cold brewed coffee solution was detected to be 15 mg equivalent/g of coffee. When the apparatus of the present invention was used, the same amount of coffee powder was added to the generated nano-bubble-containing water to react for one minute, and at the same time, the ultrasonic generator was started. The ultrasonic generator vibrated for 20 seconds/minute. After reaction, the level of scavenging free radicals relative to vitamin C in the extracted coffee solution was detected to be 20 mg equivalent/g of coffee.

The antioxidant level (i.e., scavenging free radicals) of coffee made by the conventional cold brewing method and the antioxidant level of coffee extracted using the apparatus at a temperature lower than environment temperature are compared. When the conventional cold brewing method was used, a certain amount of coffee powder was added to tap water to react for two minutes, and the level of scavenging free radicals relative to vitamin C in the conventional cold brewed coffee solution was detected to be 4 mg equivalent/g of coffee. When the apparatus of the present invention was used, the same amount of coffee powder was added to the generated nano-bubble-containing water to react for two minutes, and at the same time, the ultrasonic generator was started. The ultrasonic generator vibrated for 20 seconds/minute. After reaction, the level of scavenging free radicals relative to vitamin C in the extracted coffee solution was detected to be 10 mg equivalent/g of coffee.

Example 2

Figure 8:
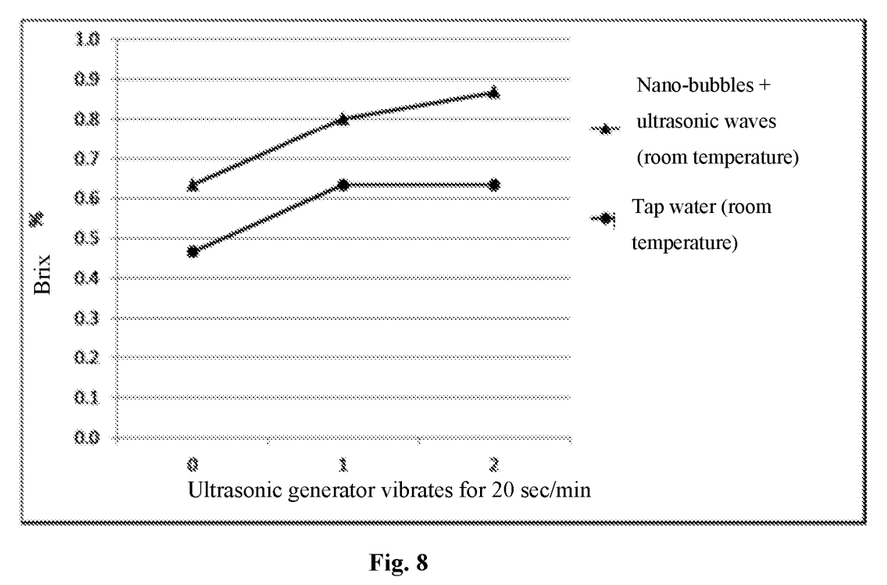
FIG. 8 is an effect comparison diagram of Brix level of coffee components of coffee made by cold brewing and coffee extracted using the apparatus of the present invention at room temperature.
Figure 9:
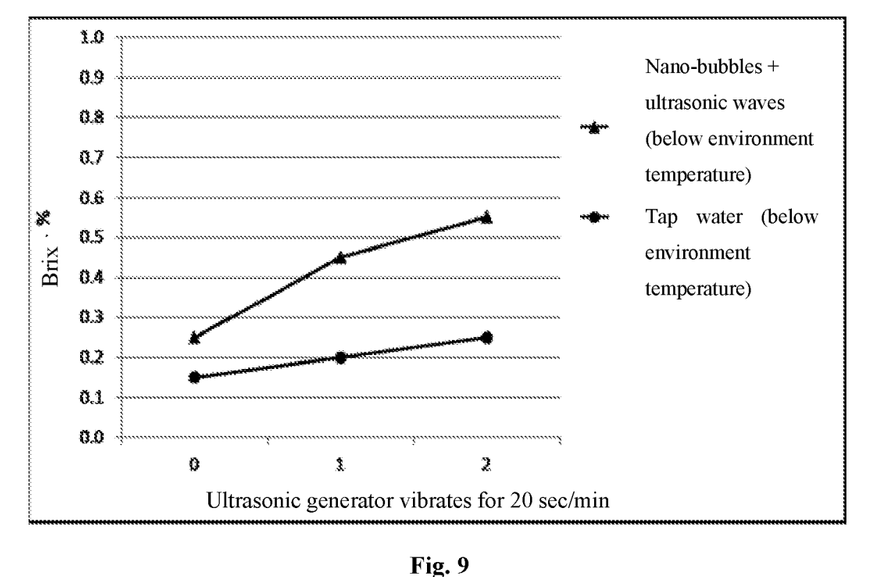
FIG. 9 is an effect comparison diagram of Brix level of coffee components of coffee made by cold brewing and coffee extracted using the apparatus of the present invention at a temperature lower than environment temperature.

As shown in FIGS. 8 to 9, the Brix level (Brix %) of coffee made by the conventional cold brewing method and the Brix level (Brix %) of coffee extracted using the apparatus at room temperature are compared. When the conventional cold brewing method was used, a certain amount of coffee powder was added to tap water to react for one minute, and the Brix level of the conventional cold brewed coffee solution was detected to be 0.65. When the apparatus of the present invention was used, the same amount of coffee powder was added to the generated nano-bubble-containing water to react for one minute, and at the same time, the ultrasonic generator was started. The ultrasonic generator vibrated for 20 seconds/minute. After reaction, the Brix level of the extracted coffee solution was detected to be 0.8.

The Brix level (Brix %) of coffee made by the conventional cold brewing method and the Brix level (Brix %) of coffee extracted using the apparatus at a temperature lower than environment temperature are compared. When the conventional cold brewing method was used, a certain amount of coffee powder was added to tap water to react for two minutes, and the Brix level of the conventional cold brewed coffee solution was detected to be 0.25. When the apparatus of the present invention was used, the same amount of coffee powder was added to the generated nano-bubble-containing water to react for two minutes, and at the same time, the ultrasonic generator was started. The ultrasonic generator vibrated for 20 seconds/minute. After reaction, the Brix level of the extracted coffee solution was detected to be 0.55.

Example 3

Figure 10:
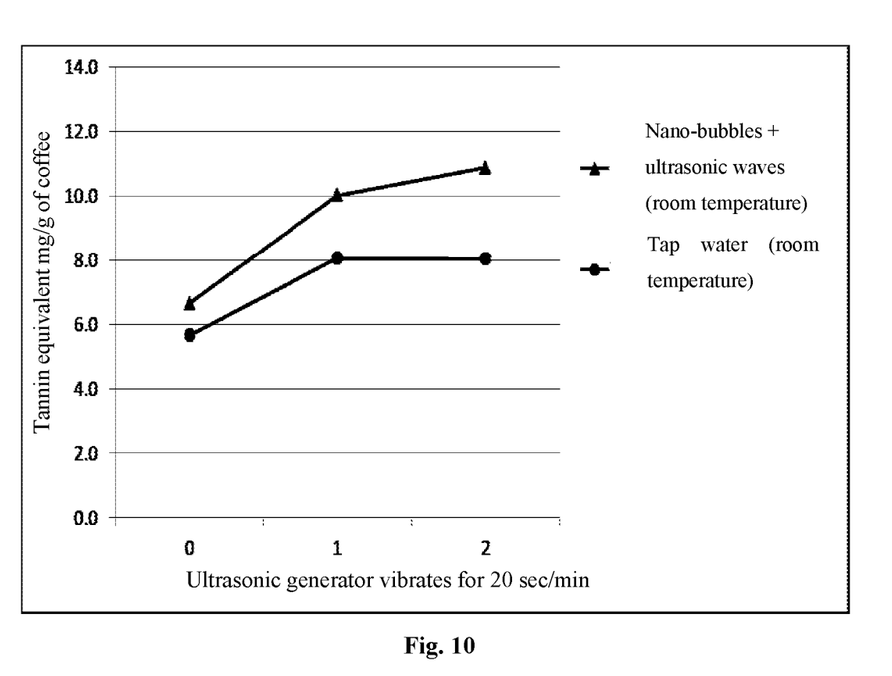
FIG. 10 is an effect comparison diagram of polyphenolic components of coffee components of coffee made by cold brewing and coffee extracted using the apparatus of the present invention at room temperature.
Figure 11:
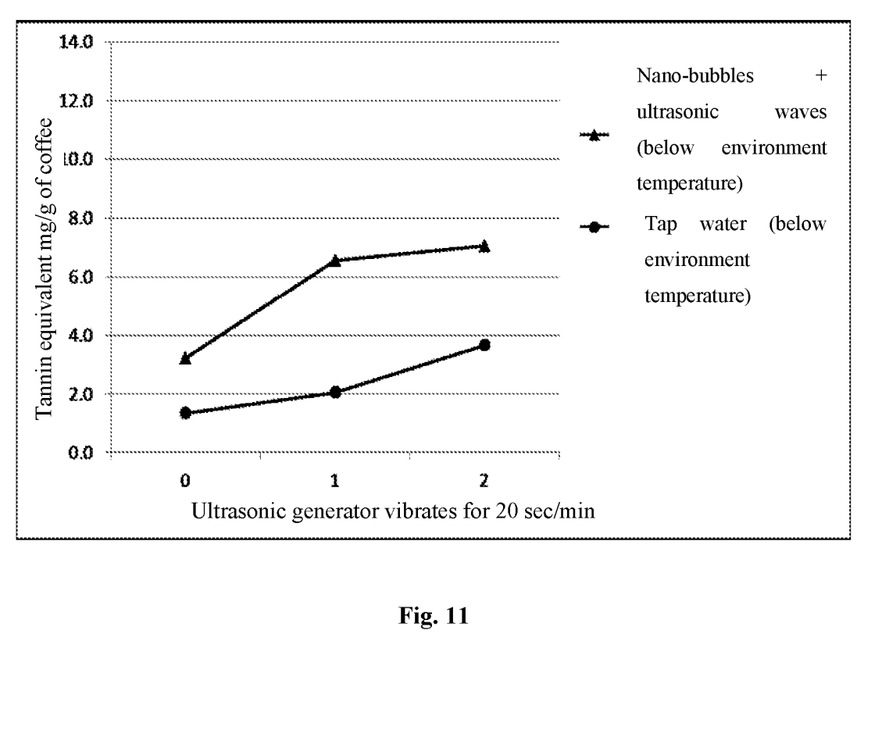
FIG. 11 is an effect comparison diagram of polyphenolic components of coffee components of coffee made by cold brewing and coffee extracted using the apparatus of the present invention at a temperature lower than environment temperature.

As shown in FIGS. 10 to 11, the polyphenolic components of coffee components of coffee made by the conventional cold brewing method and the polyphenolic components of coffee components of coffee extracted using the apparatus at room temperature are compared. When the conventional cold brewing method was used, a certain amount of coffee powder was added to tap water to react for one minute, and the polyphenolic components in the conventional cold brewed coffee solution were detected to be 8 mg tannin/g of coffee. When the apparatus of the present invention was used, the same amount of coffee powder was added to the generated nano-bubble-containing water to react for one minute, and at the same time, the ultrasonic generator was started. The ultrasonic generator vibrated for 20 seconds/minute. After reaction, the polyphenolic components in the extracted coffee solution were detected to be 10 mg tannin/g of coffee.

The polyphenolic components of coffee components of coffee made by the conventional cold brewing method and the polyphenolic components of coffee components of coffee extracted using the apparatus at a temperature lower than environment temperature are compared. When the conventional cold brewing method was used, a certain amount of coffee powder was added to tap water to react for two minutes, and the polyphenolic components in the conventional cold brewed coffee solution were detected to be 3.8 mg tannin/g of coffee. When the apparatus of the present invention was used, the same amount of coffee powder was added to the generated nano-bubble-containing water to react for two minutes, and at the same time, the ultrasonic generator was started. The ultrasonic generator vibrated for 20 seconds/minute. After reaction, the polyphenolic components in the extracted coffee solution were detected to be 7 mg tannin/g of coffee.

In summary, the present invention uses a nano-bubble generating device to increase the content of nano-bubbles in a liquid, conveys the liquid containing nano-bubbles to a reaction container to mix with a solid powder, and at the same time, starts an energy generator to act on the mixture to burst the nano-bubbles to enhance the effect of extracting components in a solid in the liquid, which helps in increasing Brix, polyphenolic antioxidants and other substances for enhancing the taste of a beverage in beverages such as coffee, Chinese, Western and Japanese tea, and herbal tea.

It should be noted that those of ordinary skill in the art may make variations and modifications to the above-described embodiments according to the disclosure and teaching of the specification. Therefore, the present invention is not limited to the specific embodiments disclosed and described above, and modifications and variations of the invention should fall within the protection scope of the claims of the present invention. In addition, although some specific terms are used in the present specification, these terms are merely for convenience of description and do not limit the invention.

What is claimed is:

1. An apparatus for extracting a component in a solid by using nano-bubbles for preparation of beverage for consumption, wherein the apparatus comprising
    a reaction container configured to hold a solid to be extracted;
    a nano-bubble generating device configured to generate a liquid containing nano-bubbles; and
    an energy generator;
    wherein the liquid containing nano-bubbles is used to be mixed with the solid to be extracted; and
    wherein the energy generator is used to emit energy to the reaction container to burst the nano-bubbles;
    wherein the energy generator comprises an emission head which is arranged above the reaction container, and a first switch valve configured to control a solution output state is arranged on the reaction container.

2. The apparatus according to claim 1, wherein the apparatus further comprising
    a conveying device configured to convey the liquid containing nano-bubbles to the reaction container to be mixed with the solid to be extracted; and
    wherein the nano-bubble generating device comprises a fluid inlet tube and a fluid outlet tube, and the fluid outlet tube is connected with the conveying device.

3. The apparatus according to claim 2, wherein the apparatus further comprises a liquid storage container which is connected with the fluid inlet tube.

4. The apparatus according to claim 3, wherein the conveying device comprises a liquid pump and a conduit, and the liquid pump is connected with the reaction container through the conduit.

5. The apparatus according to claim 4, wherein the apparatus further comprises a heater which is arranged at any one position of a position selected from the group consisting of above the liquid storage container, a position between the liquid pump and the reaction container, and a position below the reaction container.

6. The apparatus according to claim 1, wherein the energy generator is a generator selected from the group consisting of sonic generator and ultrasonic generator.

7. The apparatus according to claim 1, wherein the reaction container having a bottom, wherein a first cutter head for piercing is further arranged at the bottom of the reaction container, and the first cutter head is interlocked with the first switch valve.

8. The apparatus according to claim 3, wherein the solid is a powder selected from the group consisting of coffee powder, Chinese, Western tea powder, Japanese tea powder, and herbal tea, and wherein the liquid including water.

9. A method for extracting a component in a solid by using nano-bubbles with use of an apparatus for preparation of beverage for consumption, including the following steps:
  generating a liquid containing nano-bubbles by a nano-bubble generating device;
  conveying with the use of a conveying device the liquid containing nano-bubbles to a reaction container to mix and react with a solid to be extracted in the reaction container;
  during mixing and reaction, emitting energy to the reaction container by an energy generator to burst the nano-bubbles;
  wherein the energy generator comprises an emission head which is arranged above the reaction container, and a first switch valve configured to control a solution output state is arranged on the reaction container.

10. The method of claim 9, wherein the nano-bubble generating device comprises a fluid inlet tube and a fluid outlet tube, and the fluid outlet tube is connected with the conveying device.

11. The method of claim 10, wherein the apparatus further comprises a liquid storage container which is connected with the fluid inlet tube.

12. The method of claim 11, wherein the conveying device comprises a liquid pump and a conduit, and the liquid pump is connected with the reaction container through the conduit.

13. The method of claim 12, wherein the apparatus further comprises a heater which is arranged at any one position of a position selected from the group consisting of above the liquid storage container, a position between the liquid pump and the reaction container, and a position below the reaction container.

14. The method of claim 9, wherein the energy generator is a generator selected from the group consisting of sonic generator and ultrasonic generator.

15. The method of claim 9, wherein the reaction container having a bottom, wherein a first cutter head for piercing is further arranged at the bottom of the reaction container, and the first cutter head is interlocked with the first switch valve.

16. The method of claim 9, wherein the solid is a powder selected from the group consisting of coffee powder, Chinese, Western tea powder, Japanese tea powder, and herbal tea, and wherein the liquid including water.

\* \* \* \* \*